US006960639B2

(12) United States Patent
Weikard et al.

(10) Patent No.: US 6,960,639 B2
(45) Date of Patent: Nov. 1, 2005

(54) RADIATION-CURING COATING COMPOSITIONS

(75) Inventors: Jan Weikard, Odenthal (DE); Erhard Lühmann, Bomlitz (DE); Christoph Irle, Barcelona (ES); Thorsten Rische, Unna (DE); Karin Naujoks, Odenthal (DE); Thomas Feller, Solingen (DE); Jan Mazanek, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 119 days.

(21) Appl. No.: 10/458,119

(22) Filed: Jun. 10, 2003

(65) Prior Publication Data

US 2004/0006152 A1 Jan. 8, 2004

(30) Foreign Application Priority Data

Jun. 17, 2002 (DE) ........................................ 102 26 932

(51) Int. Cl.$^7$ .............................................. C08G 18/80
(52) U.S. Cl. ........................ 528/45; 524/501; 524/590; 524/840; 522/90; 522/104; 522/146; 525/440; 525/457; 526/301; 526/302
(58) Field of Search ................................. 524/501, 590, 524/840; 522/90, 104, 146; 525/440, 457; 528/45; 526/301, 302

(56) References Cited

U.S. PATENT DOCUMENTS

| | | | |
|---|---|---|---|
| 6,207,774 B1 | 3/2001 | Hasegawa et al. | .......... 524/507 |
| 6,335,381 B1 | 1/2002 | Hovestadt et al. | ............ 522/84 |
| 6,583,214 B1 * | 6/2003 | Haeberle et al. | ............ 524/589 |

FOREIGN PATENT DOCUMENTS

| | | |
|---|---|---|
| DE | 197 36 083 | 2/1999 |
| DE | 198 55 146 | 5/2000 |

* cited by examiner

*Primary Examiner*—Rachel Gorr
(74) *Attorney, Agent, or Firm*—Joseph C. Gil

(57) ABSTRACT

Aqueous coating compositions based on polyurethane dispersions which cure under the influence of high-energy radiation, to a process for preparing them and to their use. The coating compositions contain a polyisocyanate, a polyurethane containing free-radically polymerizable groups, and an initiator which is capable of initiating a free-radical polymerization.

17 Claims, No Drawings

RADIATION-CURING COATING COMPOSITIONS

CROSS REFERENCE TO RELATED PATENT APPLICATION

The present application claims the right of priority under 35 U.S.C. §119 (a)–(d) of German Patent Application No. 102 26 932.7, filed Jun. 17, 2002.

BACKGROUND OF THE INVENTION

1. Field of the Invention

The invention relates to aqueous coating compositions based on polyurethane dispersions which cure under the influence of high-energy radiation, to a process for preparing them and to their use.

2. Description of the Related Art

Known from the prior art are aqueous one-component (1K) coating compositions which comprise a binder containing active hydrogen atoms and a crosslinker and which are crosslinked and cured by thermal activation. A disadvantage of these systems, however, is that curing is slow and requires high temperatures.

Likewise known are aqueous coating compositions which cure physically, corresponding to a curing of the coat by filming. In systems of this kind, normally no crosslinking agents are used. Physical curing can be assisted by chemical crosslinking by means of atmospheric oxygen.

Substantially more rapid is the curing of coatings based on radiation-curable polyurethane dispersions: that is, polyurethane dispersions containing polymerizable groups. Such dispersions are described in, for example, EP-A 0 942 022. A disadvantage there is that the radiation-curable coatings only cure completely when they are irradiated with a certain dose and intensity, for example with UV light. If it is desired to coat objects having a complex geometry, then it is problematic, in shadow regions, for example, to produce a high level of chemical and physical resistance in the coating.

WO-A 00/59978 discloses an aqueous coating material which is curable thermally and/or with actinic radiation and comprises a polyurethane containing active hydrogen atoms, based on bis(4-isocyanatocyclohexyl)methane with a trans/trans content of up to 30% by weight, based on the diisocyanate, as binder and at least one crosslinking agent. Unsaturated groups are introduced laterally or terminally into the polyurethane by means of low-molecular-weight, isocyanate-reactive compounds such as trimethylolpropane monoacrylate. A disadvantage here is the use of monomeric unsaturated units, which, as monofunctional units, restrict the molecular weight of the polyurethane or, as pure difunctional molecules, for example trimethylolpropane monoacrylate, are very expensive.

EP-A 0 952 170 describes a coating system which comprises a urethane (meth)acrylate containing free NCO groups, a photoinitiator and one or more aqueous binder containing active hydrogen atoms. The curing of this system combines both crosslinking via the reaction of the isocyanate groups of the active hydrogen atoms of the binder and UV curing via the urethane (meth)acrylates. A disadvantage here is the relatively low UV reactivity, owing to a low density of double bonds, and a poorer initial physical drying before UV curing, owing to the relatively low molecular mass of the urethane methacrylate.

SUMMARY OF THE INVENTION

Accordingly, the present invention provides aqueous UV-curing polyurethane dispersions which possess a rapid curing mechanism and allow adequate crosslinking of regions which are difficult to illuminate.

It has been found that aqueous UV-curing polyurethane dispersions containing polymerizable groups containing few or no active hydrogen atoms can be postcrosslinked with polyisocyanates. The polyurethane dispersion of the invention may be in the form either of a two-component (2K) or of a one-component (1K) system. In the case of the 1K system, the isocyanates are present alongside the binder and are therefore used preferably in blocked form. The binders of the invention exhibit better adhesion than pure UV binders, greater reactivity than non-UV systems, and better resistance towards liquids that stain.

The invention provides aqueous coating compositions comprising (I) at least one polyisocyanate (A), (II) at least one polyurethane (B) which contains free-radically polymerizable groups and up to 0.53 mmol/g, such as from 0 to 0.53 mmol/g, preferably up to 0.4 mmol/g, such as from 0 to 0.4 mmol/g, with particular preference up to 0.25 mmol/g, such as from 0 to 0.25 mmol/g, of groups containing Zerevitinov-active hydrogen atoms, and (III) an initiator (C) which is capable of initiating a free-radical polymerization.

For the purposes of the present invention, groups containing Zerevitinov-active hydrogen atoms are hydroxyl, primary or secondary amine or thiol groups.

DETAILED DESCRIPTION OF THE INVENTION

The polyisocyanate (A) of the coating composition of the invention can be used in the form of unblocked polyisocyanate (A') or blocked polyisocyanate (A").

In accordance with the invention the polyurethanes are in the form of aqueous polyurethane dispersions, emulsions or solutions which are prepared by polyaddition of diisocyanates or second polyisocyanates (component a) with isocyanate-reactive compounds (component (b1) to (b5)).

Suitable second polyisocyanates (a) are aromatic, araliphatic, aliphatic or cycloaliphatic polyisocyanates. It is also possible to use mixtures of such polyisocyanates. Examples of suitable polyisocyanates are butylene diisocyanate, hexamethylene diisocyanate (HDI), isophorone diisocyanate (IPDI), 2,2,4 and/or 2,4,4-trimethylhexamethylene diisocyanate, the isomeric bis(4,4'-isocyanato-cyclohexyl)methanes or their mixtures of any desired isomer content, isocyanatomethyl-1,8-octane diisocyanate, 1,4-cyclohexylene diisocyanate, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane 4,4',4"-triisocyanate or derivatives thereof having a urethane, isocyanurate, allophanate, biuret, uretdione and/or iminooxadiazinedione structure, and mixtures thereof. Preference is given to hexamethylene diisocyanate, isophorone diisocyanate and the isomeric bis(4,4'-isocyanatocyclohexyl)methanes, and to mixtures thereof.

The polyurethane (B) present in the aqueous coating compositions of the invention is a reaction product of (a) one or more second polyisocyanates (b1) one or more hydrophilicizing compounds containing nonionic groups and/or ionic groups and/or groups which can be converted into ionic groups, (b2) one or more compounds containing free-radically polymerizable groups, (b3) if desired, one or more polyol compounds having an average molecular weight of from 50 to 500, preferably from 80 to 200, and a hydroxyl functionality of greater than or equal to 2 and less than or equal to 3, (b4) if desired, one or more polyol compounds having an average molecular weight of from 500 to 13000 g/mol, preferably from 700 to 4000 g/mol with an average hydroxyl functionality of from 1.5 to 2.5, preferably from 1.8 to 2.2, with particular preference from 1.9 to 2.1, (b5) if desired, one or more di- or polyamines.

Component (b1) contains ionic groups, which may be either cationic or anionic in nature, and/or nonionic hydrophilic groups. Cationically, anionically or nonionically dispersing compounds are those containing, for example, sulfonium, ammonium, phosphonium, carboxylate, sulfonate, phosphonate groups or the groups which can be converted by salt formation into the aforementioned groups (potentially ionic groups) or polyether groups, and can be incorporated into the macromolecules by isocyanate-reactive groups that are present. Isocyanate-reactive groups suitable with preference are hydroxyl groups and amine groups.

Suitable ionic or potentially ionic compounds (b1) are, for example, mono- and dihydroxycarboxylic acids, mono- and diaminocarboxylic acids, mono- and dihydroxysulfonic acids, mono- and diaminosulfonic acids and also mono- and dihydroxyphosphonic acids or mono- and diaminophosphonic acids and their salts such as dimethylolpropionic acid, dimethylolbutyric acid, hydroxypivalic acid, N-(2-aminoethyl)-β-alanine, 2-(2-aminoethylamino) ethanesulfonic acid, ethylenediame-propyl- or butylsulfonic acid, 1,2- or 1,3-propylenediamine-β-ethylsulfonic acid, maleic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal and/or ammonium salts; the adduct of sodium bisulfite with but-2-ene-1,4-diol, polyethersulfonate, the propoxylated adduct of 2-butenediol and $NaHSO_3$, described for example in DE-A 2 446 440 (page 5–9, formula I–III), and also units which can be converted into cationic groups, such as N-methyldiethanolamine, as hydrophilic synthesis components. Preferred ionic or potential ionic compounds are those possessing carboxyl or carboxylate and/or sulfonate groups and/or ammonium groups. More preferred ionic compounds are those containing carboxyl and/or sulfonate groups as anionic or potentially ionic groups, such as the salts of N-(2-aminoethyl)-β-alanine, of 2-(2-aminoethylamine)ethanesulfonic acid or of the adduct of IPDI and acrylic acid (EP-A 0 916 647, Example 1) and also of dimethylolpropionic acid.

Suitable nonionically hydrophilicizing compounds are, for example, polyoxy-alkylene ethers which contain at least one hydroxyl or amino group. These polyethers include a fraction of from 30% by weight to 100% by weight of units derived from ethylene oxide. They suitably include linear polyethers with a functionality of between 1 and 3, but also compounds of the general formula (I)

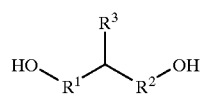

(I)

in which $R^1$ and $R^2$ independently of one another each denote a divalent aliphatic, cycloaliphatic or aromatic radical having 1 to 18 carbon atoms which can be interrupted by oxygen and/or nitrogen atoms, and $R^3$ stands for an alkoxy-terminated polyethylene oxide radical.

Examples of nonionically hydrophilicizing compounds also include monohydric polyalkylene oxide polyether alcohols containing on average from 5 to 70, preferably from 7 to 55, ethylene oxide units per molecule, as are obtainable conventionally by alkoxylating suitable starter molecules (e.g. in Ullmanns Encyclopädie der technischen Chemie, 4th edition, Volume 19, Verlag Chemie, Weinheim pp. 31–38).

Examples of suitable starter molecules are saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are, in particular, ethylene oxide and propylene oxide, which can be used in any order or else in a mixture for the alkoxylation reaction.

The polyalkylene oxide polyether alcohols are either pure polyethylene oxide polyethers or mixed polyalkylene oxide polyethers at least 30 mol %, preferably at least 40 mol %, of whose alkylene oxide units are composed of ethylene oxide units. Preferred nonionic compounds are monofunctional mixed polyalkylene oxide polyethers containing at least 40 mol % of ethylene oxide and not more than 60 mol % of propylene oxide units.

Component (b1) is preferably a combination of nonionic and ionic hydrophilicizing agents. Particular preference is given to combinations of nonionic and anionic hydrophilicizing agents. Component (b2) contains free-radically polymerizable double bonds, preferably hydroxy-functional acrylates or methacrylates. Examples are 2-hydroxyethyl (meth)acrylate, polyethylene oxide mono(meth)acrylates, polypropylene oxide mono(meth)acrylates, polyalkylene oxide mono(meth)acrylates, poly(ε-capro-lactone) mono (meth)acrylates, such as Tone® M100 (Union Carbide, USA), 2-hydroxypropyl (meth)acrylate, 4-hydroxybutyl (meth)acrylate, 3-hydroxy-2,2-dimethylpropyl (meth)acrylate, the mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or the technical-grade mixtures thereof. Preference is given to the acrylated monoalcohols. Also suitable are alcohols obtainable from the reaction of acids containing double bonds with monomeric epoxide compounds optionally containing double bonds, such as, for example, the reaction products of (meth)acrylic acid with glycidyl (meth)acrylate or with the glycidyl ester of Versatic acid.

Additionally, isocyanate-reactive oligomeric or polymeric unsaturated compounds containing acrylate and/or methacrylate groups can be used, alone or in combination with the aforementioned monomeric compounds. As component (b2) it is preferred to use hydroxyl-containing polyester acrylates having an OH content of from 30 to 300 mg KOH/g, preferably from 60 to 200, with particular preference from 70 to 120. For the preparation of the hydroxy-functional polyester acrylates it is possible to employ a total of 7 groups of monomer constituents:

1. (Cyclo)alkanediols such as dihydric alcohols containing (cyclo)aliphatically attached hydroxyl groups of the molecular weight range from 62 to 286, e.g. ethanediol, 1,2- and 1,3-propanediol, 1,2-,
2. 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, such as diethylene glycol, triethylene glycol, tetraethylene glycol, dipropylene glycol, tripropylene glycol, polyethylene, polypropylene or polybutylene glycols having a molecular weight of from 200 to 4000, preferably from 300 to 2000, with particular preference from 450 to 1200. Reaction products of the aforementioned diols with ε-caprolactone or other lactones may likewise be employed as diols.
3. Alcohols with a functionality of three or more, from the molecular weight range from 92 to 254, such as glycerol, trimethylolpropane, pentaerythritol, dipentaerythritol and sorbitol, or polyethers prepared starting from these alcohols, such as the reaction product of 1 mol of trimethylolpropane with 4 mol of ethylene oxide.
4. Monoalcohols such as ethanol, 1- and 2-propanol, 1- and 2-butanol, 1-hexanol, 2-ethylhexanol, cyclohexanol and benzyl alcohol.
5. Dicarboxylic acids from the molecular weight range from 104 to 600 and/or their anhydrides, such as phthalic acid, phthalic anhydride, isophthalic acid, tetrahydrophthalic acid, tetrahydrophthalic anhydride, hexahydrophthalic acid, hexahydrophthalic anhydride, cyclohexane dicarboxylic acid, maleic anhydride, fumaric acid, malonic acid, succinic acid, succinic anhydride, glutaric acid, adipic acid, pimelic acid, suberic acid, sebacic acid, dodecanedioic acid, hydrogenated dimer fatty acids.
6. Higher polyfunctional carboxylic acids and/or their anhydrides, such as trimellitic acid and trimellitic anhydride.
7. Monocarboxylic acids, such as benzoic acid, cyclohexanecarboxylic acid, 2-ethylhexanoic acid, caproic acid, caprylic acid, capric acid, lauric acid, natural and synthetic fatty acids.
8. Acrylic acid, methacrylic acid and/or dimeric acrylic acid.

Suitable hydroxyl-containing polyester acrylates comprise the reaction product of at least one constituent from group 1 or 2 with at least one constituent from group 4 or 5 and at least one constituent from group 7.

Where appropriate, groups with a dispersing action which are common knowledge from the prior art can also be incorporated into these polyester acrylates. For instance, as the alcohol component it is possible to make proportional use of polyethylene glycols and/or methoxy polyethylene glycols. Examples of compounds that may be used also include alcohol-derived polyethylene glycols, polypropylene glycols and the block copolymers thereof, and also the monomethyl ethers of these polyglycols. Particular suitability is possessed by polyethylene glycol 1500 monomethyl ether and/or polyethylene glycol 500 monomethyl ether.

Furthermore, it is possible, after the esterification, to react some carboxyl groups, especially those of the (meth)acrylic acid, with mono-, di- or polyepoxides. Preferred epoxies (glycidyl ethers) are, for example, those of monomeric, oligomeric or polymeric bisphenol A, bisphenol F, hexanediol and/or butanediol or their ethoxylated and/or propoxylated derivatives. This reaction may be used in particular to raise the OH number (OHN) of the polyester (meth) acrylate, since one OH group is formed in each epoxide-acid reaction. The acid number of the resulting product lies between 0 and 20 mg KOH/g, preferably between 0 and 10 mg KOH/g and with particular preference between 0 and 5 mg KOH/g. The reaction is preferably catalysed by catalysts such as triphenylphosphine, thiodiglycol, ammonium and/or phosphonium halides and/or zirconium or tin compounds such as tin(II) ethylhexanoate.

The preparation of polyester acrylates is described in DE-A 4 040 290 (p. 3, line 25–p. 6, line 24), DE-A-3 316 592 (p. 5, line 14–p. 11, line 30) and P. K. T. Oldring (Ed.), Chemistry & Technology of UV & EB Formulations For Coatings, Inks & Paints, Vol. 2, 1991, SITA Technology, London, p. 123–135.

Likewise preferred as component (b2) are the conventional hydroxyl-containing epoxy (meth)acrylates having OH contents of from 20 to 300 mg KOH/g, preferably from 100 to 280 mg KOH/g, with particular preference from 150 to 250 mg KOH/g, or hydroxyl-containing polyurethane (meth)acrylates having OH contents of from 20 to 300 mg KOH/g, preferably from 40 to 150 mg KOH/g, with particular preference from 50 to 100 mg KOH/g, and also their mixtures with one another and mixtures with hydroxyl-containing unsaturated polyesters and also mixtures with polyester (meth)acrylates or mixtures of hydroxyl-containing unsaturated polyesters with polyester (meth) acrylates. Such compounds are likewise described in P. K. T. Oldring (Ed.), Chemistry & Technology of UV & EB Formulations For Coatings, Inks & Paints, Vol. 2, 1991, SITA Technology, London pp. 37–56. Hydroxyl-containing epoxy (meth)acrylates are based in particular on reaction products of acrylic acid and/or methacrylic acid with epoxides (glycidyl compounds) of monomeric, oligomeric or polymeric bisphenol A, bisphenol F, hexanediol and/or butanediol or their ethoxylated and/or propoxylated derivatives.

Suitable low molecular weight polyols (b3) are short-chain, i.e. $C_2$ to $C_{20}$, aliphatic, araliphatic or cycloaliphatic diols or triols. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Preference is given to 1,4-butanediol, 1,4-cyclohexanedimethanol and 1,6-hexanediol. Examples of suitable triols are trimethylolethane, trimethylolpropane or glycerol; trimethylolpropane is preferred.

Suitable polyols of higher molecular weight (b4) are diols or polyols having a number-average molecular weight in the range from 500 to 13000 g/mol, preferably from 700 to 4000 g/mol. Preferred polymers are those having an average hydroxyl functionality of from 1.5 to 2.5, preferably from 1.8 to 2.2, with particular preference from 1.9 to 2.1. They include, for example, polyester alcohols based on aliphatic, cycloaliphatic and/or aromatic dicarboxylic, tricarboxylic and/or polycarboxylic acids with diols, triols and/or polyols, and also lactone-based polyester alcohols. Preferred polyester alcohols are, for example, reaction products of adipic acid with hexanediol, butanediol or neopentyl glycol or mixtures of the said diols having a molecular weight from 500 to 4000, with particular preference from 800 to 2500. Likewise suitable are polyetherols, which are obtainable by polymerizing cyclic ethers or by reacting alkylene oxides with a starter molecule. By way of example, mention may be made of the polyethylene and/or polypropylene glycols with an average molecular weight of from 500 to 13000, and also polytetrahydrofurans with an average molecular weight of from 500 to 8000, preferably from 800 to 3000. Likewise suitable are hydroxyl-terminated polycarbonates obtainable by reacting diols or else lactone-modified diols or else bisphenols, such as bisphenol A, with phosgene or carbonic diesters such as diphenyl carbonate or dimethyl carbonate. By way of example, mention may be made of the polymeric carbonates of 1,6-hexanediol having an average molecular weight of from 500 to 8000, and also the carbonates of reaction products of 1,6-hexanediol with $\epsilon$-caprolactone in a molar ratio of from 1 to 0.1. Preference is given to aforementioned polycarbonate diols with an average molecular weight of from 800 to 3000 based on 1,6-hexanediol and/or carbonates of reaction products 1,6-hexanediol with $\epsilon$-caprolactone in a molar ratio of from 1 to 0.33. Hydroxyl-terminated polyamide alcohols and hydroxyl-terminated polyacrylatediols e.g. Tegomer® BD 1000 (Tego GmbH, Essen, Del.), can likewise be used.

Component (b5) is selected from the group of the diamines and/or polyamines, which are used for the purpose of increasing the molar mass and are preferably added towards the end of the polyaddition reaction. This reaction takes place preferably in the aqueous medium. In that case the diamines and/or polyamines must be more reactive than water towards the isocyanate groups of component (a). By way of example, mention may be made of ethylenediamine, 1,3-propylene-diamine, 1,6-hexamethylenediamine, isophoronediamine, 1,3-, 1,4-phenylene-diamine, 4,4'-diphenylmethanediamine, amino-functional polyethylene oxides of polypropylene oxides, which are obtainable under the name Jeffamin®, D series (Huntsman Corp. Europe, Belgium), diethylenetriamine, triethylenetetramine and hydrazine. Preference is given to isophoronediamine, ethylenediamine and 1,6-hexamethylenediamine. Ethylenediamine is more preferred.

Proportionally it is also possible to add monoamines, such as butylamine, ethylamine and amines of the Jeffamin® M series (Huntsman Corp. Europe, Belgium), amino-functional polyethylene oxides and polypropylene oxides.

The preparation of the aqueous polyurethane (B) may be conducted in one or more stages in homogeneous phase or, in the case of multistage reaction, partially in disperse phase. Following polyaddition, carried out completely or partially, there is a dispersing, emulsifying or dissolving step. This is followed where appropriate by a further polyaddition or modification in disperse phase.

For the preparation of the polyurethane (B) it is possible to use all of the techniques known from the prior art, such as emulsifier/shear force, acetone, prepolymer mixing, melt emulsification, ketimine and solids/spontaneous dispersion techniques, or derivatives thereof. A compilation of these methods can be found in Methoden der organischen Chemie (Houben-Weyl, Erweiterungs- und Folgebände to the 4th edition, volume E20, H. Bartl and J. Falbe, Stuttgart, New York, Thieme 1987, pp. 1671–1682) Preference is given to the melt emulsification technique and to the acetone technique. The acetone technique is more preferred.

Normally, in the preparation of a polyurethane prepolymer, the reactor is charged in whole or in part with constituents (b1) to (b5) which contain no primary or secondary amino groups and with a second polyisocyanate (a) and this initial charge is diluted where appropriate with a water-miscible but isocyanate-inert solvent, but preferably without solvent, and is heated to relatively high temperatures, preferably in the range from 50 to 120° C.

Examples of suitable solvents are acetone, butanone, tetrahydrofuran, dioxane, acetonitrile, dipropylene glycol dimethyl ether and 1-methyl-2-pyrrolidone, which can be added not only at the beginning of the preparation but also, where appropriate, in portions later on as well. Acetone and butanone are preferred. It is possible to conduct the reaction under atmospheric pressure or elevated pressure; for example, above the atmospheric-pressure boiling temperature of an optionally added solvent such as acetone, for example.

It is additionally possible to include the catalysts known to accelerate the isocyanate addition reaction in the initial charge or to meter them in later, examples of these catalysts being triethylamine, 1,4-diazabicyclo[2.2.2]octane, tin dioctoate or dibutyltin dilaurate. Dibutyltin dilaurate is preferred.

Subsequently, any constituents (a) and/or (b1) to (b4) containing no primary or secondary amino groups that were not added at the beginning of the reaction are metered in. In the preparation of the polyurethane prepolymer, the molar ratio of isocyanate groups to isocyanate-reactive groups is from 0.90 to 3, preferably from 0.95 to 2, with particular preference from 1.05 to 1.5. The reaction of components (a) with (b) takes place partly or completely, but preferably completely, based on the total amount of isocyanate-reactive groups of the portion of (b) that contains no primary or secondary amino groups. The degree of reaction is normally monitored by following the NCO content of the reaction mixture. For this purpose it is possible to perform both spectroscopic measurements, e.g. infrared or near-infrared spectra, determinations of the refractive index, and chemical analyses, such as titrations, on samples taken. Polyurethane prepolymers containing free isocyanate groups are obtained, without solvent or in solution.

The preparation of the polyurethane prepolymers from (a) and (b) is followed or accompanied, if not already carried out in the starting molecules, by the partial or complete formation of salts of the anionically and/or cationically dispersing groups. In the case of anionic groups, this is done using bases such as ammonia, ammonium carbonate or hydrogen carbonate, trimethylamine, triethylamine, tributylamine, diisopropylethylamine, dimethylethanolamine, diethylethanolamine, triethanolamine, potassium hydroxide or sodium carbonate, preferably triethylamine, triethanolamine, dimethylethanolamine or diisopropylethylamine. The molar amount of the bases is between 50 and 100%, preferably between 60 and 90%, of the molar amount of the anionic groups. In the case of cationic groups use is made of dimethyl sulfate or succinic acid. Where only nonionically hydrophilicized compounds (b1) containing ether groups are used, there is no need for the neutralization step. Neutralization may also take place simultaneously with dispersion, with the dispersing water already containing the neutralizing agent.

Any remaining isocyanate groups are reacted with diamines or polyamines (b5) and/or, if present, with amine-type components (b1). This chain extension can be carried out either in solvent before dispersion or in water after dispersion. Where amine-type components are present in (b1), chain extension preferably takes place prior to dispersion.

The diamines or polyamines (b5) and/or if present, the amine-type component (b1) can be added in dilution with organic solvents and/or with water to the reaction mixture. It is preferred to use from 70 to 95% by weight of solvent and/or water. Where two or more amine-type components (b1) and/or (b5) are present, the reaction may take place in succession, in any order, or simultaneously, by addition of a mixture.

To prepare the polyurethane dispersion (B), the polyurethane prepolymers are either introduced into the dispersing water, where appropriate under high shear, such as vigorous stirring, for example, or, conversely, the dispersing water is stirred into the prepolymers. This can be followed, if it has not already taken place in the homogeneous phase, by the raising of the molar mass by reaction of any isocyanate groups present with component (b5). The amount of polyamine (b5) employed depends on the unreacted isocyanate groups still present. It is preferred to react from 50 to 100%, with particular preference from 75 to 95%, of the molar amount of isocyanate groups with polyamines (b5).

The resultant polyurethane-polyurea polymers have an isocyanate content of from 0 to 2% by weight, preferably from 0 to 0.5% by weight.

Where appropriate, the organic solvent can be removed by distillation. The dispersions have a solids content of from 20 to 70% by weight, preferably from 30 to 65% by weight. The non-volatile fractions of these dispersions contain from 0 to 0.53 mmol/g, preferably from 0 to 0.4 mmol/g, with particular preference from 0 to 0.25 mmol/g, of chemical groups containing Zerevitinov-active hydrogen atoms.

As polyisocyanate (A) it is possible to use non-blocked polyisocyanates (A'), which are obtainable by modifying simple aliphatic, cycloaliphatic, araliphatic and/or aromatic diisocyanates, polyisocyanates synthesized from at least two diisocyanates and having a uretdione, isocyanurate, allophanate, biuret, iminooxadiazinedione and/or oxadiazinetrione structure, as described by way of example in, for example, J. Prakt. Chem. 336 (1994) page 185–200.

Suitable diisocyanates for preparing the polyisocyanates (A') are diisocyanates of the molecular weight range from 140 to 400 which are obtainable by phosgenation or by phosgene-free processes, for example by thermal urethane cleavage, and contain aliphatically, cycloaliphatically, araliphatically and/or aromatically attached isocyanate groups, such as, for example, 1,4-diisocyanatobutane, 1,6-diisocyanatehexane (HDI), 2-methyl-1,5-diisocyanatopentane, 1,5-diisocyanate-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, bis(isocyanatomethyl)norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates.

Also suitable, furthermore, are triisocyanates such as triphenylmethane 4,4',4"-triisocyanate and/or 4-isocyanatomethyl-1,8-octane diisocyanate.

The starting components (A') are preferably polyisocyanates or polyisocyanate mixtures of the type stated containing exclusively aliphatically and/or cycloaliphatically attached isocyanate groups.

More preferred starting components (A') are polyisocyanates or polyisocyanate mixtures with isocyanurate and/or biuret structure based on HDI, IPDI and/or 4,4'-diisocyanatodicyclohexylmethane.

In order to improve the ease of incorporation of the said polyisocyanates (A') into the aqueous binder (B), the polyisocyanates are preferably hydrophilically modified. Hydrophilicized polyisocyanates mentioned above are used for this purpose, in accordance with methods which are known per se. Hydrophilicization may take place, for example, anionically, cationically or nonionically by way of internal or external emulsifiers.

Suitable internal emulsifiers, for example, are those described above under component (b1). Polyisocyanates which have become hydrophilicized by virtue of carboxyl groups can be stirred very finely into aqueous systems without the need for high shear forces, after the carboxyl groups have been neutralized. It is additionally possible to use polyisocyanates hydrophilically modified by polyethers. The preparation of such water-dispersible polyisocyanates is elucidated at length, for example, in EP-A 0 959 087 (page 2, lines 25–46) and EP-A 1 065 228 (page 4 line 43 to page 10 line 35).

Internal emulsifiers which are likewise suitable are the ionically hydrophilicized water-emulsifiable polyisocyanates described in EP-A 0 703 255, comprising as emulsifiers reaction products of polyisocyanate and any desired hydroxy-, mercapto- or amino-functional compounds containing at least one sulfuric-acid group or the anion thereof. Preferred sulfuric-acid synthesis components for preparing the emulsifiers are hydroxysulfonic acids containing aliphatically attached OH groups, or the salts of such hydroxysulfonic acids, examples being specific polyether sulfonates, such as those sold under the name Tegomer® (Th. Goldschmidt AG, Essen, Del.), for example, bisulfite adducts with unsaturated alcohols, hydroxyethanesulfonic and hydroxypropanesulfonic acid, and aminosulfobetaines, which are preparable by quaternization of tertiary amino alcohols with 1,3-propane sultone. Preference is also given to 2-(cyclohexylamino)ethanesulfonic acid and 3-cyclohexylamino)propanesulfonic acid or their salts as hydrophilizing components.

Examples of suitable external emulsifiers are anionic emulsifiers, such as those with an alkyl sulfate basis, alkylarylsulfonates, alkylphenol polyether sulfates, as specified, for example, in Houben-Weyl, Methoden der organischen Chemie, Erweiterungs und Folgebände, 4th edition, volume E 20, 1987 (part 1, pages 259 to 262) or alkyl polyether sulfates, or nonionic emulsifiers, such as the alkoxylation products, preferably ethoxylation products, of alkanols, phenols or fatty acids, for example.

It is further possible for the polyisocyanates described to contain, in addition, unsaturated groups, preferably acrylate or methacrylate groups. Polyisocyanates of this kind are known per se and are described in, for example, U.S. Pat. No. 6,335,381 (p. 2, line 43 to p. 8, line 48). They are obtained, for example, by partial reaction of the abovementioned polyisocyanates with hydroxy-functional acrylate or methacrylate compounds, such as hydroxyethyl acrylate or pentaerythritol triacrylate, for example. Use is preferably made in this context of acrylate compounds having an average hydroxy functionality of between 0.2 and 2, preferably between 0.4 and 1.2.

The polyisocyanates (A') have an NCO content of from 1% to 50%, preferably from 8% to 25%. Where appropriate, they may be diluted with a water-miscible but isocyanate-inert solvent.

Preference is given to using polyisocyanates hydrophilicized by means of internal emulsifiers, with particular preference polyether-hydrophilicized polyisocyanates containing allophanate, which are described in, for example, EP-A 1 065 228 (page 4, line 43 to page 10 line 35). Preferably, from 60 to 99 mol % of the polyether are attached to the polyisocyanate via allophanate groups.

Suitable blocked polyisocyanates (A") used in the coating compositions of the invention are water-dispersible or water-soluble blocked polyisocyanates.

Suitable water-dispersible or water-soluble blocked polyisocyanates (A") are obtained by reacting
(A"1) at least one polyisocyanate containing aliphatically, cycloaliphatically, araliphatically and/or aromatically attached isocyanate groups,
(A"2) at least one ionic or potentially ionic and/or nonionic compound,
(A"3) at least one blocking agent,
(A"4) if desired, one or more (cyclo)aliphatic mono- or polyamines having from 1 to 4 amino groups, from the molecular weight range from 32 to 300,
(A"5) if desired, one or more polyhydric alcohols of from 1 to 4 hydroxyl groups, from the molecular weight range from 50 to 250, and
(A"6) if desired, one or more compounds containing isocyanate-reactive and unsaturated groups.

The polyisocyanates (A") may comprise, where appropriate, stabilizers (A"7) and other auxiliaries and also, where appropriate, solvents (A"8).

The water-dispersible or water-soluble blocked polyisocyanates (A") are synthesized from 20 to 80% by weight, preferably from 25 to 75% by weight, with particular preference from 30 to 70% by weight, as component (A"1), from 1 to 40% by weight, preferably from 1 to 35% by weight, with particular preference from 5 to 30% by weight, of component (A"2), from 15 to 60% by weight, preferably from 20 to 50% by weight, with particular preference from 25 to 45% by weight, of component (A"3), from 0 to 15% by weight, preferably from 0 to 10% by weight, with particular preference from 0 to 5% by weight, of component (A"4), from 0 to 15% by weight, preferably from 0 to 10% by weight, with particular preference from 0 to 5% by weight, of component (A"5), from 0 to 40% by weight, preferably 0% by weight, of component (A"6), and also from 0 to 15% by weight, preferably from 0 to 10% by weight, with particular preference from 0 to 5% by weight, of component (A"7) and, where appropriate, from 0 to 20% by weight, preferably from 0 to 15% by weight, with particular preference from 0 to 10% by weight, of component (A"8) the sum of the components adding up to 100% by weight.

The water-dispersible or water-soluble blocked polyisocyanates (A") can be used in the coating compositions of the invention in the form of an aqueous solution or dispersion. The solution or dispersion of polyisocyanates has a solids content of between 10 to 70% by weight, preferably from 20 to 60% by weight and with particular preference from 25 to 50% by weight and the proportion of (A"8) in the overall composition is preferably less than 15% by weight and with particular preference less than 10% by weight and with very particular preference less than 5% by weight.

The polyisocyanates (A"1) used to prepare the blocked polyisocyanates (A") have an (average) NCO functionality of from 2.0 to 5.0, preferably from 2.3 to 4.5, an isocyanate group content of from 5.0 to 27.0% by weight, preferably from 14.0 to 24.0% by weight, and a monomeric diisocyanate content of less than 1% by weight, preferably less than 0.5% by weight. The isocyanate groups of polyisocyanates (A"1) are at least 50%, preferably at least 60% and with particular preference at least 70% in blocked form.

Suitable polyisocyanates (A'1) for preparing the blocked polyisocyanates (A") are the polyisocyanates specified under (A'), synthesized from at least two diisocyanates and prepared by modifying simple aliphatic, cycloaliphatic, araliphatic and/or aromatic diisocyanates, and having a uretdione, isocyanurate, allophanate, biuret, iminooxadiazinedione and/or oxadiazinetrione structure, as described by way of example in, for example, J. Prakt. Chem. 336 (1994) page 185–200.

Suitable compounds for component (A"2) are ionic or potentially ionic and/or nonionic compounds as already described under component (b1).

Component (A"2) is preferably a combination of nonionic and ionic hydrophilicizing agents. Particular preference is given to combinations of nonionic and anionic hydrophilicizing agents.

Examples that may be mentioned of blocking agents (A"3) include the following: alcohols, lactams, oximes, malonates, alkyl acetoacetates, triazoles, phenols, imidazoles, pyrazoles, and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine or any desired mixtures of these blocking agents. Preference is given to using butanone oxime, 3,5-dimethylpyrazole, ε-caprolactam, N-tert-butylbenzylamine as blocking agent (A"3). More preferred blocking agents (A"3) are butanone oxime and ε-caprolactam.

Suitable components (A"4) include mono-, di-, tri-, and/or tetra-amino-functional substances of the molecular weight range up to 300, such as ethylenediamine, 1,2- and 1,3-diaminopropane, 1,3-, 1,4- and 1,6-diaminohexane, 1,3-diamino-2,2-dimethylpropane, 1-amino-3,3,5-trimethyl-5-aminoethyl-cyclohexane (IPDA), 4,4'-diaminodicyclohexylmethane, 2,4- and 2,6-diamino-1-methyl-cyclohexane, 4,4'-diamino-3,3'-dimethyldicyclohexylmethane, 1,4-bis(2-aminoprop-2-yl)cyclohexane or mixtures of these compounds.

Component (A"5) comprises mono-, di-, tri- and/or tetra-hydroxy-functional substances of molecular weight up to 250, such as ethylene glycol, propylene glycol, 1,4-butanediol, 1,6-hexanediols, glycerol, trimethylolethane, trimethylolpropane, the isomeric hexanetriols, pentaerythritol or mixtures of these compounds.

As component (A"6), hydroxy-functional and (meth)acryloyl-functional compounds are reacted with the isocyanates. Such compounds are described by way of example as constituents of components (b2) above. Preference is given to compounds having an average hydroxy functionality of from 0.2 to 2, with particular preference from 0.7 to 1.3. Particular preference is given to 2-hydroxyethyl (meth)acrylate, poly(ε-caprolactone) monoacrylates, such as Tone M100® (Union Carbide, USA), 2-hydroxypropyl acrylate, 4-hydroxybutyl acrylate, trimethylolpropane diacrylate, glycerol diacrylate, pentaerythritol triacrylate or dipentaerythritol pentaacrylate.

The blocked polyisocyanates (A") may comprise a stabilizer or stabilizer mixture (A"7). Examples of suitable compounds (A"7) are antioxidants such as 2,6-di-tert-butyl-4-methylphenol, UV absorbers of the 2-hydroxyphenylbenzotriazol type or light stabilizers of the HALS compound type or other commercially customary stabilizers, as described, for example, in "Lichtschutzmittel für Lacke" (A. Valet, Vincentz Verlag, Hannover, 1996), and "Stabilization of Polymeric Materials" (H. Zweifel, Springer Verlag, Berlin, 1997, Appendix 3, pp. 181–213).

Preference is given to stabilizer mixtures containing compounds having a 2,2,6,6-tretramethylpiperidinyl radical (HALS). The piperidinyl nitrogen of the HALS ring is unsubstituted and has no hydrazide structures at all. Particular preference is given to a compound of the formula (II), (II)

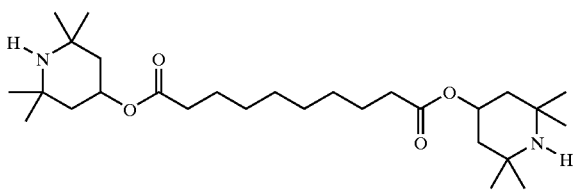

which is sold, for example, under the name Tinuvin® 770 DF by the company Ciba Spezialitäten (Lampertheim, Del.).

Ideally, the abovementioned compounds are combined with substances possessing hydrazide structures, such as acid hydrazides and acid dihydrazides, for example, such as acetic hydrazide adipic hydrazine, adipic dihydrazide or else hydrazine adducts of hydrazine and cyclic carbonates, as specified, for example, in EP-A 654 490 (p. 3, line 48 to p. 4 line 3). It is preferred to use adipic dihydrazide and an adduct of 2 mol of propylene carbonate and 1 mol of hydrazine of the general formula (III),

—CO—NH—NH— (III)

Particular preference is given to the adduct of 2 mol of propylene carbonate and 1 mol of hydrazine, of the general formula (IV):

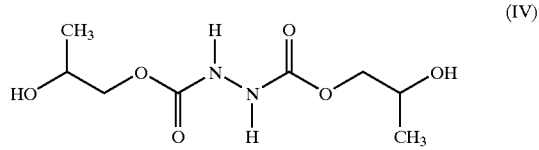
(IV)

Suitable organic solvents (A"8) include compounds customarily used as paint solvents, such as ethyl acetate, butyl acetate, 1-methoxypropyl-2-acetate, 3-methoxy-n-butyl acetate, acetone, 2-butanone, 4-methyl-2-pentanone, cyclohexanone, toluene, xylene, chlorobenzene or white spirit. Mixtures containing, in particular, aromatics with relatively high degrees of substitution, as sold, for example, under the names Solvent Naphtha, Solvesso® (Exxon Chemicals, Houston, USA), Cypar® (Shell Chemicals, Eschborn, Del.), Cyclo Sol® (Shell Chemicals, Eschborn, Del.), Tolu Sol® (Shell Chemicals, Eschborn, Del.), Shellsol® (Shell Chemicals, Eschborn, Del.) are likewise suitable. Examples of further solvents include carbonates, such as dimethyl carbonate, diethyl carbonate, 1,2-ethylene carbonate and 1,2-propylene carbonate, lactones, such as β-propiolactone, γ-butyrolactone, ε-caprolactone, ε-methylcaprolactone, propylene glycol diacetate, diethylene glycol dimethyl ether, dipropylene glycol dimethyl ether, diethylene glycol ethyl and butyl ether acetate, N-methylpyrrolidone and N-methylcaprolactam or any desired mixtures of such solvents. Preferred solvents are acetone, 2-butanone, 1-methoxypropyl 2-acetate, xylene, toluene, mixtures containing, in particular, aromatics with relatively high degrees of substitution, as sold, for example, under the names Solvent Naphtha, Solvesso® (Exxon Chemicals, Houston, USA), Cypar® (Shell Chemicals, Eschborn, Del.), Cyclo Sol® (Shell Chemicals, Eschborn, Del.), Tolu Sol® (Shell Chemicals, Eschborn, Del.), Shellsol® (Shell Chemicals, Eschborn, Del.), and N-methylpyrrolidone. Particular preference is given to acetone, 2-butanone and N-methylpyrrolidone.

The blocked polyisocyanates (A") may be prepared by known methods of the prior art (e.g. in DE-A 2 456 469, column 7–8, Example 1–5 and DE-A 2 853 937 pp. 21–26, Example 1–9).

The water-dispersible or water-soluble blocked polyisocyanates (A") may be reacted, for example, by reacting the components (A"1), (A"2), (A"3) and, where appropriate, (A"4) to (A"7) in any desired order, where appropriate with the assistance of an organic solvent (A"8).

It is preferred to react first (A"1) with, where appropriate, a portion, preferably the nonionic portion, of component (A"2) and also, where appropriate (A"4) and (A"5). This is followed by blocking with component (A"3) and, subsequently, by reaction with the portion of component (A"2) containing ionic groups. Where appropriate, organic solvents (A"8) may be added to the reaction mixture. In a further step, where appropriate, component (A"7) is added.

The preparation of the aqueous solution of dispersion of the blocked polyisocyanates (A") takes place subsequently by converting the water-dispersible blocked polyisocyanates into an aqueous dispersion of solution either by incorporating them into water or by adding water. The organic solvent (A"8) used where appropriate may be removed by distillation following the dispersion. It is preferred not to use solvent (A"8).

Aforementioned water-dispersible or water-soluble blocked polyisocyanates may also contain unsaturated groups capable of free-radical polymerization. For this purpose the polyisocyanates, before being dispersed, emulsified or dissolved in water, may first be partly blocked and then reacted with isocyanate-reactive compounds (A"6) containing unsaturated groups, or the polyisocyanates are reacted first with isocyanate-reactive compounds (A"6) containing unsaturated groups and then with blocking agents (A"3).

For the preparation of the aqueous solution or dispersion of the blocked polyisocyanates (A") the amounts of water used are generally such that the resulting dispersions have a solids content of from 10 to 70% by weight, preferably from 20 to 60% by weight and with particular preference from 25 to 50% by weight.

As initiators (C) for a free-radical polymerization it is possible to employ radiation-activatable and/or heat-activatable initiators. Photoinitiators which are activated by UV or visible light are preferred in this context. Known photo-initiators are commercially available. Unimolecular initiators are referred to as type I initiators; bimolecular initiators are referred to as type II initiators. Suitable (type I) systems include aromatic ketone compounds, e.g. benzophenones in combination with tertiary amines, alkylbenzophenones, 4,4'-bis(dimethylamino) benzophenone (Michler's Ketone), anthrone and halogenated benzophenones or mixtures of the said types. Also suitable are (type II) initiators such as benzoin and its derivatives, benzil ketals, acylphosphine oxides such as 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. Preference is given to photoinitiators which are easy to incorporate into aqueous coating compositions. Examples of such products are Irgacure® 500, Irgacure® 819 DW (Ciba, Lampertheim, Del.), Esacure® KIP (Lamberti, Aldizzate, Italy). It is also possible to use mixtures of these compounds.

Where curing is initiated thermally, peroxy compounds are suitable, such as diacyl peroxides, e.g. benzoyl peroxide, alkyl hydroperoxide such as diisopropylbenzene monohydroperoxide, alkyl peresters such as tert-butyl perbenzoate, dialkyl peroxides such as di-tert-butyl peroxide, peroxydicarbonates such as dicetyl peroxide dicarbonate, inorganic peroxides such as ammonium peroxodisulfate, potassium peroxodisulfate or else azo compounds such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis(N-cyclohexyl-2-methylpropionamides), 2,2'-azobis{2-methyl-N-[2-(1-hydroxybutyl)]propionamides}, 2,2'-azobis{2-methyl-N-[2-(1-hydroxybutyl)]propionamides, 2,2'-azobis{2-methyl-N-[1, 1-bis(hydroxymethyl)-2-hydroxyethyl]propionamides, and also benzpinacol. Preferred compounds are those which are soluble in water or in the form of aqueous emulsions. These free-radical initiators may be combined familiarly with accelerators.

The present invention likewise provides a process for preparing the aqueous coating compositions of the invention, characterized in that the constituents (I), (II) and (III) are mixed with one another in succession in any order or simultaneously. Where the coating compositions include a polyisocyanate (A') which still contains free, non-blocked isocyanate groups, they possess a pot life of from 1 to 96 hours, preferably from 4 to 24 hours, in which processing is to take place. It is therefore preferred not to mix the constituents of (II) with (I) until as short a time as possible before application. Where the coating compositions contain no free isocyanate groups, when component (A") is used, they do not have a pot life and are stable on storage for months or longer.

It is possible to employ the coating compositions used for the process of the invention on their own or to add to them the binders, auxiliaries and adjuvants that are familiar in coating technology, particularly light stabilizers such as UV absorbers and sterically hindered amines (HALS), and also antioxidants, fillers, and coatings auxiliaries, for example antisettling agents, defoamers and/or wetting agents, levelling agents, reactive diluents, plasticizers, catalysts, auxiliary solvents and/or thickeners and additives, such as dispersions, pigments, dyes or delusterants, for example. Readily possible combinations include in particular those with further binders such as polyurethane dispersions or polyacrylate dispersions which where appropriate may also be hydroxy-functional.

Even without the addition of auxiliaries, removal of the water from the coating compositions of the invention produces coatings which are dust-dried to hardness and capable of bearing mechanical loads. The water can be removed by evaporation or forced drying, for example exposure to heat, hot and/or dehumidified air and/or thermal radiation. As a result of subsequent radiation/chemical induced crosslinking and also, where appropriate, thermally induced crosslinking, the films cure to give particularly high-quality, scratch-resistant and chemical-resistant paint coatings. Following removal of the water it is preferred first to carry out curing by UV light or daylight, followed by a postcure at between 0° C. and 200° C., but preferably between 20° C. and 100° C. The postcure cures the coating even in regions which may have been illuminated poorly or not at all. This is especially advantageous when the substrate is one which cannot be highly heated, such as wood, for example. The use of the coating compositions of the invention also enhances the adhesion to the substrate.

The present specification likewise provides a method of producing coatings, characterized in that the aqueous coating composition of the invention is applied to a substrate, the water is removed and the applied coating is then cured.

The coating compositions of the invention can be applied to a wide variety of substrates by the customary techniques, such as by spraying, rolling, knife coating, pouring, squirting, brushing or dipping, for example. Substrates are selected from the group consisting of wood, metal, plastic, paper, leather, textiles, felt, glass or mineral substrates. Preferred substrates are wood, glass fibers or carbon fibers.

The applied film thicknesses (prior to curing) are typically between 0.5 and 5000 µm, preferably between 5 and 1500 µm, with particular preference between 15 and 1000 µm.

Radiation curing is preferably effected by exposure to high-energy radiation, in other words UV radiation or daylight, for example light with a wavelength of 200 to 700 nm, or by irradiation with high-energy electrons (electron beams, 150 to 300 keV). Examples of radiation sources for light or UV light include high-pressure or medium-pressure mercury vapor lamps, it being poss mercury vapor to be modified by doping with other elements such as gallium or iron. Lasers, pulsed lamps (known under the name UV flash light lamps), halogen lamps or excimer lamps are likewise possible. The lamps may be fitted with filters which prevent the exit of a portion of the emitted lamp spectrum. For example, the radiation classed as UV-C or UV-C and UV-B may be filtered out on grounds, for example, of occupational hygiene. The lamps may be a fixed installation, so that the material to be irradiation is conveyed past the radiation source by means of a mechanical apparatus, or the lamps may be moveable and the material to be irradiated remains stationary in the course of curing. The radiation dose usually sufficient for crosslinking in the case of UV curing is situated within the range from 80 to 5000 mJ/cm$^2$.

Irradiation may be carried out, where appropriate, in the absence of oxygen, for example under an inert gas atmosphere or oxygen-reduced atmosphere. Suitable inert gases are preferably nitrogen, carbon dioxide, noble gases or combustion gases. Irradiation may also take place by masking the coating with media which are transparent to the radiation. Examples of such media are, for example, polymer films, glass or liquids such as water.

In accordance with the radiation dose and curing conditions the type and concentration of any initiator used can be varied in a manner familiar to the persons skilled in the art.

Curing is effected with particular preference using high-pressure mercury lamps in fixed installations. Photoinitiators are then used in concentrations of from 0.1 to 10% by weight, with particular preference from 0.2 to 3.0% by weight, based on the solids content of the coating. To cure these coatings it is preferred to use a dose of from 200 to 3000 mJ/cm$^2$, measured in the wavelength range from 200 to 600 nm.

The invention also provides for the use of the aqueous coating compositions of the invention in adhesives, sealants and coating materials, preferably for use in materials for the coating of wood, for example in furniture coating or woodblock coating, and also for use in sizes, preferably glass fiber sizes.

EXAMPLES

UV-Curing Polyurethane Dispersions (B)

Example 1

Preparation of a polyester acrylate 1a) in analogy to DE-C 197 15 382 (p. 5, lines 21–27), OH number: 160 mg KOH/g, acid number: 1 mg KOH/g, viscosity: 0.5 Pa s at 23° C.
Preparation of a Polyester Acrylate 1b):

In a heatable reaction vessel with stirrer, gas inlet, temperature measurement, water separator and reflux condenser, 98.1 g of maleic anhydride, 739.2 g of a tetrapropoxylated trimethylol propane, 259.2 g of acrylic acid, 10.5 g of 4-toluenesulfonic acid monohydrate, 3.2 g of 4-methoxyphenol, 0.2 g of 2,5-di-tert-butylhydroquinone and 448.3 g of isooctane are heated at reflux with stirring and introduction of a stream of air of 1 l per hour. At 100° C. to 105° C., water is separated off until an acid number of 5 or below has been reached. Thereafter the solvent is distilled off under reduced pressure. This gives a polyester acrylate with an acid number of 4 mg KOH/g, an OH number of 110 mg KOH/g and a viscosity of 1.6 Pa s at 23° C.

Preparation of a Polyurethane Dispersion:

In a reaction vessel with stirrer, internal thermometer and gas inlet (stream of air 1 l/h), 101.8 g of Desmodur® W (aliphatic diisocyanate; Bayer AG, Leverkusen, Del.) are added to an initial charge composed of 278.9 g of the polyester acrylate 1b), 63.0 g of the polyester acrylate 1a), 8.5 g of neopentyl glycol, 21.9 g of dimethylolpropionic acid, 0.5 g of dibutyltin dilaurate and 167.6 g of acetone and the mixture is heated so that a constant acetone reflux prevails. The reaction mixture is stirred at this temperature until it contains an NCO content of 1.8±0.1% by weight.

The reaction mixture is then cooled to 40° C., and 14.7 g of triethylamine are added quickly. After 10 minutes, the reaction mixture is poured into 883.2 g of water at 20° C. with rapid stirring. After the dispersion has formed, 27.7 g of isophoronediamine in 77.0 g of water are added.

After 30 minutes of subsequent stirring without heating or cooling, the product is distilled under reduced pressure (50 mbar, max. 50° C.) until a solids of 39±1% by weight has been reached. The dispersion has a pH of 8.0 and an average particle size of 159 nm (laser correlation spectroscopy measurement: Zetasizer 1000, Malvern Instruments, Malvern, UK). The product contains 0.52 mmol/g of groups containing active hydrogen.

Example 2

Preparation of a Polyurethane Dispersion:

In a reaction vessel with stirrer, internal thermometer and gas inlet (stream of air 1 l/h), 113.7 g of Desmodur® I (aliphatic diisocyanate; Bayer AG, Leverkusen, Del.) and 56.6 g of Desmodur® H (aliphatic diisocyanate; Bayer AG, Leverkusen, Del.) are added to an initial charge composed of 169.0 g of the hydroxy-functional epoxy acrylate Ebecryl® 600 (UCB GmbH, Kerpen, Del.), 34.5 g of the polyacrylatediol Tegonmer® BD 1000 (Goldschmidt, Essen, Del.), 9.8 g of neopentyl glycol, 17.1 g of dimethylolpropionic acid, 0.4 g of dibutyltin dilaurate and 133.8 g of acetone and the mixture is heated so that a constant acetone reflux prevails. The reaction mixture is stirred at this temperature until it contains an NCO content of 4.0±0.1% by weight.

The reaction mixture is then cooled to 40° C., and 495.1 g of acetone are added. After 5 minutes of stirring at 40° C., 15.84 g of ethylenediamine in 63.7 g of water are added. When an NCO content <0.1% by weight has been reached, the reaction mixture is poured into 580 g of water at 20° C. with rapid stirring.

After 30 minutes of subsequent stirring without heating or cooling, the product is distilled under reduced pressure (50 mbar, max. 50° C.) until a solids of 39±1% by weight has been reached. The dispersion has a pH of 8.9 and an average particle size of 262 nm (laser correlation spectroscopy measurement: Zetasizer 1000, Malvern Instruments, Malvern, UK). The product contains 0.2 mmol/g of groups containing active hydrogen.

Example 3

Preparation of a Polyurethane Dispersion:

In a reaction vessel with stirrer, internal thermometer and gas inlet (stream of air 1 l/h), 47.2 g of Desmodur® I (aliphatic diisocyanate; Bayer AG, Leverkusen, Del.) and 77.9 g of Desmodur® H (aliphatic diisocyanate; Bayer AG, Leverkusen, Del.) are added to an initial charge composed of 169.0 g of the hydroxy-functional epoxy acrylate Ebecryl® 600 (UCB GmbH, Kerpen, Del.), 144.8 g of the polyesterdiol formed from adipic acid, hexanediol and neopentyl glycol, with a molar mass of 1700, 3.9 g of neopentyl glycol, 13.1 g of dimethylolpropionic acid, 0.3 g of dibutyltin dilaurate and 127.5 g of acetone and the mixture is heated so that a constant acetone reflux prevails. The reaction mixture is stirred at this temperature until it contains an NCO content of 3.2±0.1% by weight.

The reaction mixture is then cooled to 40° C., and 481.7 g of acetone are added. After 5 minutes of stirring at 40° C., 12.75 g of ethylenediamine in 38.3 g of water are added. When an NCO content of <0.1% by weight has been reached, 625.6 g of water at 20° C. are poured into the reaction mixture, with rapid stirring.

After 30 minutes of subsequent stirring without heating or cooling, the product is distilled under reduced pressure (50 mbar, max. 50° C.) until a solids of 39±1% by weight has been reached. The dispersion has a pH of 8.9 and an average particle size of 110 nm (laser correlation spectroscopy measurement: Zetasizer 1000, Malvern Instruments, Malvern, UK). The product contains 0.3 mmol/g of groups containing active hydrogen.

Example 4

Preparation of a Polyurethane Dispersion

A reaction vessel with stirrer, internal thermometer and gas inlet (stream of air 1 l/h) is charged with 298.0 g of the polyester acrylate 1a) and 27.0 g of the polyether LB 25 (Bayer AG, DE, monofunctional polyether based on ethylene oxide/propylene oxide with an average molar weight of 2250 (OHN=25)) and this initial charge is melted. Following the addition of 168.6 g of isophorone diisocyanate (Desmodur I®, Bayer AG, DE) and 170.0 g of acetone, the reaction mixture is heated to reflux temperature. The reaction mixture is stirred at this temperature until it contains an NCO content of 3.6–3.8% by weight. When the NCO content has been reached, the prepolymer is dissolved in 350.0 g of acetone and adjusted to 40° C.

Then a solution of 9.9 g of ethylenediamine, 47.5 g of 45% strength (by weight) AAS (2-(2-aminoethylamino) ethanesulfonic acid, in water, Bayer AG, Leverkusen, Del.) solution and 67.6 g of water is added over 2 minutes and the ingredients stirred together for 5 minutes. Then 692.8 g of water are added over the course of 10 minutes. The dispersion formed is stirred further at 40° C. until the presence of NCO in the dispersion can no longer be detected by IR spectroscopy.

The product is distilled under reduced pressure at temperatures below 50° C. until a solids of 39% by weight has been reached. The dispersion has a pH of 7.0 and an average particle size of 86 nm (laser correlation spectroscopy measurement: Zetasizer 1000, Malvern Instruments, Malvern, UK).

Example 5

Preparation of a Polyurethane Dispersion

A reaction vessel with stirrer, internal thermometer and gas inlet (stream of air 1 l/h) is charged with 298.0 g of the polyester acrylate 1a) and 27.0 g of the polyether LB 25 (Bayer AG, DE, monofunctional polyether based on ethylene oxide/propylene oxide with an average molar weight of 2250 (OHN=25)) and this initial charge is melted. Following the addition of 168.6 g of isophorone diisocyanate (Desmodur I®, Bayer AG, DE) and 170.0 g of acetone, the reaction mixture is heated to reflux temperature. The reaction mixture is stirred at this temperature until it contains an NCO content of 4.2–4.4% by weight. When the NCO content has been reached, the prepolymer is dissolved in 350.0 g of acetone and adjusted to 40° C.

Then a solution of 11.4 g of ethylenediamine, 36.9 g of 45% strength (by weight) AAS (2-(2-aminoethylamino) ethanesulfonic acid, in water, Bayer AG, Leverkusen, Del.) solution and 63.7 g of water is added over 2 minutes and the ingredients stirred together for 5 minutes. Then 698.5 g of water are added over the course of 10 minutes. The dispersion formed is stirred further at 40° C. until the presence of NCO in the dispersion can no longer be detected by IR spectroscopy.

The product is distilled under reduced pressure at temperatures below 50° C. until a solids of 39% by weight has been reached. The dispersion has a pH of 6.6 and an average particle size of 113 nm (laser correlation spectroscopy measurement: Zetasizer 1000, Malvern Instruments, Malvern, UK).

Example 6
Preparation of a Polyurethane Dispersion

A reaction vessel with stirrer, internal thermometer and gas inlet (stream of air 1 l/h) is charged with 298.0 g of the polyester acrylate 1a) and 27.0 g of the polyether LB 25 (Bayer AG, DE, monofunctional polyether based on ethylene oxide/propylene oxide with an average molar weight of 2250 (OHN=25)) and this initial charge is melted. Following the addition of 168.6 g of isophorone diisocyanate (Desmodur I®, Bayer AG, DE) and 170.0 g of acetone, the reaction mixture is heated to reflux temperature. The reaction mixture is stirred at this temperature until it contains an NCO content of 4.2–4.4% by weight. When the NCO content has been reached, the prepolymer is dissolved in 350.0 g of acetone and adjusted to 40° C.

Then a solution of 12.1 g of ethylenediamine, 31.7 g of 45% strength (by weight) AAS (2-(2-aminoethylamino) ethanesulfonic acid, in water, Bayer AG, Leverkusen, Del.) solution and 61.7 g of water is added over 2 minutes and the ingredients stirred together for 5 minutes. Then 700.9 g of water are added over the course of 10 minutes. The dispersion formed is stirred further at 40° C. until the presence of NCO in the dispersion can no longer be detected by IR spectroscopy.

The product is distilled under reduced pressure at temperatures below 50° C. until a solids of 39% by weight has been reached. The dispersion has a pH of 6.8 and an average particle size of 83 nm (laser correlation spectroscopy measurement: Zetasizer 1000, Malvern Instruments, Malvern, UK).

Example 7
Preparation of a Polyurethane Dispersion

A reaction vessel with stirrer, internal thermometer and gas inlet (stream of air 1 l/h) is charged with 139.0 g of the polyester PE 170 HN (ester based on adipic acid, 1,6-hexanediol, neopentyl glycol, MW=1700, Bayer AG, Leverkusen, Del.), 238.5 g of the polyester acrylate 1a) and 27.0 g of the polyether LB 25 (Bayer AG, DE, monofunctional polyether based on ethylene oxide/propylene oxide with an average molar rate of weight (OHN=25)) and this initial charge is melted. Following the addition of 168.6 g of isophorone diisocyanate (Desmodur I®, Bayer AG, DE) and 170.0 g of acetone, the reaction mixture is heated to reflux temperature. The reaction mixture is stirred at this temperature until it contains an NCO content of 3.6–3.8% by weight. When the NCO content has been reached, the prepolymer is dissolved in 350.0 g of acetone and adjusted to 40° C.

Then a solution of 11.4 g of ethylenediamine, 36.9 g of 45% strength (by weight) AAS (2-(2-aminoethylamino) ethanesulfonic acid, in water, Bayer AG, Leverkusen, Del.) solution and 63.7 g of water is added over 2 minutes and the ingredients stirred together for 5 minutes. Then 817.7 g of water are added over the course of 10 minutes. The dispersion formed is stirred further at 40° C. until the presence of NCO in the dispersion can no longer be detected by IR spectroscopy.

The product is distilled under reduced pressure at temperatures below 50° C. until a solids of 40% has been reached. The dispersion has a pH of 6.8 and an average particle size of 83 nm (laser correlation spectroscopy measurement: Zetasizer 1000, Malvern Instruments, Malvern, UK).

Example 8
Preparation of a Polyurethane Dispersion

A reaction vessel with stirrer, internal thermometer and gas inlet (stream of air 1 l/h) is charged with 278.0 g of the polyester PE 170 HN (ester based on adipic acid, 1,6-hexanediol, neopentyl glycol, MW=1700, Bayer AG, Leverkusen, Del.), 179.0 g of the polyester acrylate 1a) and 27.0 g of the polyether LB 25 (Bayer AG, DE, monofunctional polyether based on ethylene oxide/propylene oxide with an average molar weight of 2250 (OHN=25)) and this initial charge is melted. Following the addition of 168.6 g of isophorone diisocyanate (Desmodur I®, Bayer AG, DE) and 170.0 g of acetone, the reaction mixture is heated to reflux temperature. The reaction mixture is stirred at this temperature until it contains an NCO content of 3.3–3.5% by weight. When the NCO content has been reached, the prepolymer is dissolved in 350.0 g of acetone and adjusted to 40° C.

Then a solution of 11.4 g of ethylenediamine, 36.9 g of 45% strength (by weight) AAS (2-(2-aminoethylamino) ethanesulfonic acid, in water, Bayer AG, Leverkusen, Del.) solution and 63.7 g of water is added over 2 minutes and the ingredients stirred together for 5 minutes. Then 936.9 g of water are added over the course of 10 minutes. The dispersion formed is stirred further at 40° C. until the presence of NCO in the dispersion can no longer be detected by IR spectroscopy.

The product is distilled under reduced pressure at temperatures below 50° C. until a solids of 40% has been reached. The dispersion has a pH of 6.7 and an average particle size of 176 nm (laser correlation spectroscopy measurement: Zetasizer 1000, Malvern Instruments, Malvern, UK).

Example 9
Preparation of a Polyurethane Dispersion

A reaction vessel with stirrer, internal thermometer and gas inlet (stream of air 1 l/h) is charged with 418.0 g of the polyester PE 170 HN (ester based on adipic acid, 1,6-hexanediol, neopentyl glycol, MW=1700, Bayer AG, Leverkusen, Del.), 119.0 g of the polyester acrylate 1a) and 27.0 g of the polyether LB 25 (Bayer AG, DE, monofunctional polyether based on ethylene oxide/propylene oxide with an average molar weight of 2250 (OHN=25)) and this initial charge is melted. Following the addition of 168.6 g of isophorone diisocyanate (Desmodur I®, Bayer AG, DE) and 170.0 g of acetone, the reaction mixture is heated to reflux temperature. The reaction mixture is stirred at this temperature until it contains an NCO content of 3.0–3.2% by weight. When the NCO content has been reached, the prepolymer is dissolved in 350.0 g of acetone and adjusted to 40° C.

Then a solution of 11.4 g of ethylenediamine, 36.9 g of 45% strength (by weight) AAS (2-(2-aminoethylamino) ethanesulfonic acid, in water, Bayer AG, Leverkusen, Del.) solution and 63.7 g of water is added over 2 minutes and the ingredients stirred together for 5 minutes. Then 1057.2 g of water are added over the course of 10 minutes. The dispersion formed is stirred further at 40° C. until the presence of NCO in the dispersion can no longer be detected by IR spectroscopy.

The product is distilled under reduced pressure at temperatures below 50° C. until a solid of 40% has been reached. The dispersion has a pH of 6.7 and an average particle size of 192 nm (laser correlation spectroscopy measurement: Zetasizer 1000, Malvern Instruments, Malvern, UK).

Water-Dispersible Blocked Polyisocyanate (Component A″)

Example 10

154.1 g of a polyisocyanate containing biuret groups and based on 1,6-diisocyanatohexane (HDI) having an NCO content of 23.0%, are stirred at 100° C. with 6.3 g of polyether LB 25 (Bayer AG, DE, monofunctional polyether based on ethylene oxide/propylene oxide, having an average molar weight of 2250 (OHN=25)) for 30 minutes. Then, at 90° C., 60.6 g of butanone oxime are added over the course of 20 minutes at a rate such that the temperature of the reaction mixture does not exceed 110° C. The reaction mixture is stirred at 100° C. until the theoretical NCO value has been reached, and then is cooled to 90° C. After a subsequent stirring time of 5 minutes, a mixture of 22.0 g of the hydrophilicizing agent KV 1386 (N-(2-aminoethyl)-β-alanine, BASF AG, Ludwigshafen, Del.) and 37.5 g of water is metered in over the course of 2 minutes and stirring is continued at neutral temperature for a further 7 minutes. This is followed by dispersion, by the addition of 485.5 g of water. After a subsequent stirring time of 4 hours a storage-stable aqueous dispersion is obtained which has a solids content of 29.8%.

Coating Compositions Comprising UV-Curable Polyurethane Dispersions and Polyisocyanates (A')

Example 11
Preparation of Pigmented Paints

TABLE 1

Preparation of a pigment paste by dispersing the following constituents in a dissolver at 2000 rpm:

| Substance | Function | Parts by weight | Manufacturer |
|---|---|---|---|
| Water | | 24.3 | — |
| Disperbyk ® | Dispersing assistant | 7.5 | BYK-Chemie GmbH (Wesel, DE) |
| Dehydran ® 1293 | Defoamer | 0.7 | Cognis GmbH & Co. KG (Dusseldorf, DE) |
| R-KB-2 | Titanium dioxide pigment | 50.5 | Kerr McGee GmbH & Co. KG (Leverkusen, DE) |
| Blanc Fix ® | Titanium dioxide pigment | 17.0 | Sachtleben Chemie GmbH (Duisburg, DE) |

TABLE 2

Preparation of 5 paints by dispersing the following constituents in a dissolver at 500 rpm:

| Substance | Parts by weight | Manufacturer |
|---|---|---|
| UV polyurethane dispersion: UV-PUR 1 | 58.8 | Example 1 |
| UV-PUR 2 | | Example 2 |
| UV-PUR 3 | | Example 3 |
| UV-PUR 4 = Bayhydrol ® UV VP LS 2317 (UV-curing polyurethane dispersion, approximately 37% in water, containing 0.0 mmol/g of groups containing active hydrogen) | | Bayer AG, Lev., DE |
| UV-PUR 5 = Bayhydrol ® UV VP LS 2280 (UV-curing polyurethane dispersion, about 39% in water, containing 0.2 mmol/g of groups containing active hydrogen) | | Bayer AG, Lev., DE |
| Butyl glycol/water 1:1 | 8.6 | |
| Acemat ® TS100 (delustrant) | 0.5 | Degussa AG, Marl, DE |
| Lanco Wax ® TF 1778 (dispersing auxiliary) | 0.5 | Langro-Chemie, Stuttgart, DE |
| Dehydran ® 1293 (defoamer) | 0.45 | Cognis GmbH & CoKG, Düsseldorf, DE |
| Irgacure ® 1700 (photoinitiator) | 0.95 | Ciba-Spezialitäten GmbH, Lampertheim, DE |
| BYK ® 348 (levelling additive) | 0.5 | BYK-Chemie GmbH, Wesel, DE |
| Tafigel ® PUR 50 (thickener) | 0.3 | Münzing-Chemie GmbH, Heilbronn, DE |
| Pigment paste | 29.4 | Table 1 |

Curing Agent: Bayhydur® VP LS 2336, solvent-free hydrophilicized polyisocyanate based on hexamethylene diisocyanate, NCO content 16.2% by weight, viscosity 6800 mpas at 23° C. (Bayer AG, Leverkusen, Del.).

Two series of paints were applied. The 1$^{st}$ series, comparative contained only UV-curing PU dispersions as binders. The 2$^{nd}$ series, inventive additionally contained 10 parts by weight of the curing agent. Using a manual doctor blade, films with a wet thickness of 150 μm were applied to medium density fiberboard (MDF) panels surfaced with a white foil. Initial drying was carried out at 20° C. for 15 minutes and at 50° C. for 45 minutes. Curing was then carried out with UV light on a UV-curing station from IST (Nürtingen, Del.) with a gallium-doped UV lamp (type CK I) with an output of 80 W/cm lamp length, at an advancing speed of 2.5 m/min. Seven days after curing, the paint surfaces were exposed to various chemicals/liquids that stain and were then inspected for damage. The results are summarized in Tables 3 and 4:

TABLE 3

| | Series 1 (not inventive) | | | | |
|---|---|---|---|---|---|
| | UV-PUR 1 | UV-PUR 2 | UV-PUR 3 | UV-PUR 4 | UV-PUR 5 |
| Ethanol (6 h) 50% | 4BL/2 | 4BL/2BL | 5/5 | 5/5 | 4BL/2BL |
| Water (16 h) | 2BL/0 | 2BL/1BL | 2BL/0 | 2BL/2BL | 2BL/1BL |
| Red wine (6 h) | 4BL/4 | 3BL/3 | 4BL/4 | 4BL/4BL | 4BL/4BL |
| Coffee (16 h) | 4BL/4 | 3BL/3 | 4/4 | 4BL/4 | 4BL/4 |

TABLE 4

Series 2 (inventive, additionally containing 10 parts by weight of curing agent)

|  | UV-PUR 1 | UV-PUR 2 | UV-PUR 3 | UV-PUR 4 | UV-PUR 5 |
|---|---|---|---|---|---|
| Ethanol (6 h) 50% | 1/0 | 3/2 | 2/0 | 2/1 | 2/0 |
| Water (16 h) | 0/0 | 1/0 | 0/0 | 1BL/0 | 0/0 |
| Red wine (6 h) | 4/4 | 3/2 | 4/4 | 4/2 | 3/2 |
| Coffee (16 h) | 4/4 | 1/1 | 4/4 | 4/4 | 3/3 |

Evaluation:
Rating 0: satisfactory, no damage found
Rating 6: test area completely destroyed
BL: blistering
First rating: assessment immediately after exposure
Second rating: 3 days after exposure Example 12
Improving the Adhesion to Aluminium Foil:
Preparation of a Clear Varnish:

| 86.00 parts by weight | Bayhydrol ® UV VP LS 2282 (UV-curing polyurethane dispersion, about 39% by weight in water, Bayer AG, Leverkusen, DE), the product contains 0.0 mmol/g of groups containing active hydrogen. |
| 4.30 parts by weight | Bayhydrol ® PR 340 (non-functional aliphatic, anionic polyester-polyurethane dispersion, about 40% in water, Bayer AG, Leverkusen, DE) |
| 0.40 part by weight | BYK ® 348 |
| 0.80 part by weight | Irgacure ® 500 |
| 8.40 parts by weight | Bayhydur ® VP LS 2336 (solvent-free hydrophilicized polyisocyanate based on hexamethylene diisocyanate, NCO content 16.2% by weight, viscosity 6800 mPas at 23° C., Bayer AG, Leverkusen, DE) |

Inventive:

Using a manual doctor blade, films with a wet thickness of 25 μm were applied to aluminium foil. Initial drying was carried out at 50° C. for 1 minute. Curing was then carried out with UV light on a UV curing station from IST (N ürtingen, Del.) using a mercury UV lamp (type CK) with an output of 80 W/cm lamp length, with a rate of advance of 5 m/min. Seven days after curing, the varnish surfaces were exposed and then inspected for damage.
Tests and Results:
Heat resistance 1 second at 300° C.: satisfactory
Sterilization resistance (40 minutes 125° C., waterbath pH 8.0): satisfactory
Dry and wet strength: satisfactory
Comparative (not Inventive):
The tests were repeated without the addition of the curing agent Bayhydur® VP LS 2336. No sterilization resistance and no wet strength was found, i.e. the varnish films parted from the aluminium foil.
Coating Compositions Comprising UV-Curable Polyurethane Dispersions and Water-Dispersible Blocked Polyisocyanates (A")

Example 13–15

The constitutions of the coating compositions are described in Tables 5–8. The mechanical properties of the coating composition are determined on free films produced as follows:

A film applicator consisting of two polished rolls which can be set an exact distance apart had a release paper inserted into it ahead of the backroll. The distance between the paper and the front roll was adjusted using a feeler gauge. This distance corresponds to the (wet) film thickness of the resulting coating, and can be adjusted for the desired application rate of any coating. It is also possible to carry out coating consecutively in two or more coats. To apply the individual coats, the products (aqueous formulations are adjusted beforehand to a viscosity of 4500 mPa·s$^{-1}$ by addition of ammonia/polyacrylic acid) were poured onto the nip between the paper and the front roll, the release paper was pulled vertically downwards, the corresponding film being formed on the paper. Where two or more coats are to be applied, each individual coat is dried and the paper is reinserted.

The 100% modulus was determined in accordance with DIN 53504 on films with a thickness of 100 to 200 μm.

Film storage under hydrolysis conditions takes place in accordance with DIN EN 12280–3. The mechanical properties of these film samples are determined following 24 hours of storage under standard conditions (20° C. and 65% air humidity) in accordance with DIN 53504.

The results of the tests of the mechanical properties of the free films demonstrate that with the coating compositions set out above, depending on drying conditions, the various crosslinking mechanisms can be addressed selectively, separately from one another.

$1^{st}$ Conditions (Comparative)
Drying at 20° C. for 45 minutes
Drying at 80° C. for 10 minutes

TABLE 5

500 μm wet film applied to release paper

| Composition | Example 13 | Example 14 | Example 15 |
|---|---|---|---|
| UV PU dispersion | | | |
| Example 4 [g] | 360.0 | | |
| Example 5 [g] | | 360.0 | |
| Example 6 [g] | | | 360.0 |
| Polyisocyanate A" | | | |
| Example 10 [g] | 40.0 | 40.0 | 40.0 |
| Irgacure ® 500 [g] | 2.8 | 3.0 | 3.0 |
| Mixing ratio | 90:10 | 90:10 | 90:10 |
| NVC of the mixture [%] | 34.4 | 38 | 37.7 |
| Irgacure ® 500 as part of NVC | 2% | 2% | 2% |
| Preparation of the pastes | | | |
| Mixture [g] | 200.0 | 200.0 | 200.0 |
| 25% Ammonia | 3 ml | 2 ml | 2 ml |
| Mirox ® AM, 1:1 in H$_2$O | 3 ml | 13.5 ml | 2 ml |
| Tensile tests on free films | | | |
| 100% modulus [MPa] | 0.4 | 0.5 | 0.4 |
| Tensile strength [MPa] | 0.5 | 0.6 | 0.6 |
| Elongation at break [%] | 450 | 590 | 610 |
| 14 d hydrolysis Tensile strength [MPa] Elongation at break [%] | film has run | film has run | film has run |

NVC = non-volatiles content
Mirox ® AM = thickener (Stockhausen, Krefeld, DE)

$2^{nd}$ Conditions (Comparative)
Drying at 20° C. for 45 minutes
Drying at 80° C. for 10 minutes
Drying at 150° C. for 30 minutes

TABLE 6

500 μm wet film applied to release paper

| Composition | Example 13 | Example 14 | Example 15 |
|---|---|---|---|
| UV PUR dispersion | | | |
| Example 4 [g] | 360.0 | | |
| Example 5 [g] | | 360.0 | |
| Example 6 [g] | | | 360.0 |
| Polyisocyanate A" | | | |
| Example 10 [g] | 40.0 | 40.0 | 40.0 |
| Irgacure ® 500 [g] | 2.8 | 3.0 | 3.0 |
| Mixing ratio | 90:10 | 90:10 | 90:10 |
| NVC of the mixture [%] | 34.4 | 38 | 37.7 |
| Irgacure ® 500 as part of NVC | 2% | 2% | 2% |
| Preparation of the pastes | | | |
| Mixture [g] | 200.0 | 200.0 | 200.0 |
| 25% Ammonia | 3 ml | 2 ml | 2 ml |
| Mirox ® AM, 1:1 in H₂O | 3 ml | 13.5 ml | 2 ml |
| Tensile tests on free films | | | |
| 100% modulus [MPa} | 3 | 3.1 | 1.8 |
| Tensile strength [MPa] | 4.3 | 4.3 | 3.8 |
| Elongation at break [%] | 290 | 270 | 380 |
| 14 d hydrolysis | film has run | film has run | film has run |
| Tensile strength [MPa] | | | |
| Elongation at break [%] | | | |

NVC = non-volatiles content
Mirox ® AM = thickener (Stockhausen, Krefeld, DE)

3ʳᵈ Conditions (Comparative)
  Drying at 20° C. for 45 minutes
  Drying at 80° C. for 10 minutes
  UV drying: 2.5 m/min 80 W/cm

TABLE 7

500 μm wet film applied to release paper

| Composition | Example 13 | Example 14 | Example 15 |
|---|---|---|---|
| UV PUR dispersion | | | |
| Example 4 [g] | 360.0 | | |
| Example 5 [g] | | 360.0 | |
| Example 6 [g] | | | 360.0 |
| Polyisocyanate A" | | | |
| Example 10 [g] | 40.0 | 40.0 | 40.0 |
| Irgacure 500 [g] | 2.8 | 3.0 | 3.0 |
| Mixing ratio | 90:10 | 90:10 | 90:10 |
| NVC of the mixture [%] | 34.4 | 38.0 | 37.7 |
| Irgacure 500 as part of NVC | 2% | 2% | 2% |
| Preparation of the pastes | | | |
| Mixture [g] | 200.0 | 200.0 | 200.0 |
| 25% Ammonia | 3 ml | 2 ml | 2 ml |
| Mirox AM, 1:1 in H₂O | 3 ml | 3.5 ml | 2 ml |
| Tensile tests on free films | | | |
| 100% modulus [MPa} | 5.6 | 3.6 | 3.4 |
| Tensile strength [MPa] | 6.8 | 4.4 | 4.6 |
| Elongation at break [%] | 120 | 120 | 130 |
| 14 d hydrolysis | | | |
| Tensile strength [MPa] | 11.7 | 9.2 | 9.2 |
| Elongation at break [%] | 120 | 130 | 140 |
| 4 week hydrolysis | | | |
| Tensile strength [MPa] | 11.5 | 9.3 | 9.6 |
| Elongation at break [%] | 100 | 120 | 130 |

TABLE 7-continued

500 μm wet film applied to release paper

| Composition | Example 13 | Example 14 | Example 15 |
|---|---|---|---|
| 6 week hydrolysis | | | |
| Tensile strength [MPa] | 11.9 | 11.5 | 11 |
| Elongation at break [%] | 140 | 160 | 160 |
| 8 week hydrolysis | | | |
| Tensile strength [MPa] | 8.7 | 7.7 | 9.9 |
| Elongation at break [%] | 140 | 180 | 160 |
| 10 week hydrolysis | | | |
| Tensile strength [MPa] | 5.9 | 3.9 | 8.1 |
| Elongation at break [%] | 170 | 210 | 170 |

NVC = non-volatiles content
Mirox ® AM = thickener (Stockhausen, Krefeld, DE)

4ᵗʰ Conditions (Inventive)
  Drying at 20° C. for 45 minutes
  Drying at 80° C. for 10 minutes
  UV drying: 2.5 m/min 80 W/cm
  Drying at 150° C. for 30 minutes

TABLE 8

500 μm wet film applied to release paper

| Composition | Example 13 | Example 14 | Example 15 |
|---|---|---|---|
| UV PUR dispersion | | | |
| Example 4 [g] | 360.0 | | |
| Example 5 [g] | | 360.0 | |
| Example 6 [g] | | | 360.0 |
| Polyisocyanate A" | | | |
| Example 10 [g] | 40.0 | 40.0 | 40.0 |
| Irgacure 500 [g] | 2.8 | 3.0 | 3.0 |
| Mixing ratio | 90:10 | 90:10 | 90:10 |
| NVC of the mixture [%] | 34.4 | 38.0 | 37.7 |
| Irgacure 500 as part of NVC | 2% | 2% | 2% |
| Preparation of the pastes | | | |
| Mixture [g] | 200.0 | 200.0 | 200.0 |
| 25% Ammonia | 3 ml | 2 ml | 2 ml |
| Mirox AM, 1:1 in H₂O | 3 ml | 3.5 ml | 2 ml |
| Tensile tests on free films | | | |
| 100% modulus [MPa] | not measurable | not measurable | not measurable |
| Tensile strength [MPa] | 21 | 19.1 | 18.4 |
| Elongation at break [%] | 50 | 50 | 50 |
| 14 d hydrolysis | | | |
| Tensile strength [MPa] | 16.8 | 14.7 | 15.4 |
| Elongation at break [%] | 60 | 60 | 60 |
| 4 week hydrolysis | | | |
| Tensile strength [MPa] | 18 | 17.6 | 17 |
| Elongation at break [%] | 50 | 70 | 50 |
| 6 week hydrolysis | | | |
| Tensile strength [MPa] | 16.5 | 14.7 | 18.1 |
| Elongation at break [%] | 70 | 70 | 70 |
| 8 week hydrolysis | | | |
| Tensile strength [MPa] | 14.6 | 11.7 | 15.4 |
| Elongation at break [%] | 90 | 80 | 70 |
| 10 week hydrolysis | | | |
| Tensile strength [MPa] | 11.4 | 10.7 | 12.8 |
| Elongation at break [%] | 110 | 110 | 70 |

TABLE 8-continued

500 μm wet film applied to release paper

| Composition | Example 13 | Example 14 | Example 15 |
| --- | --- | --- | --- |

NVC = non-volatiles content
Mirox ® AM = thickener (Stockhausen, Krefeld, DE)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous coating compositions comprising
   (I) at least one polyisocyanate,
   (II) at least one polyurethane which contains free-radically polymerizable groups and up to 0.53 mmol/g, of groups containing Zerevitinov-active hydrogen atoms, and
   (III) an initiator which is capable of initiating a free-radical polymerization, wherein the polyurethane is a reaction product of
   (a) one or more second polyisocyanates,
      (b1) one or more hydrophilicizing compounds containing at least one of nonionic groups and/or ionic groups and/or groups which can be converted into ionic groups, and
      (b2) one or more compounds containing free-radicaily polymerizable groups selected from the group consisting of hydroxy-functional acrylates, hydroxy-functional methacrylates and combinations thereof.

2. Aqueous coating compositions according to claim 1, wherein the polyisocyanate can be used as non-blocked polyisocyanate or blocked polylsocyanate.

3. Aqueous coating compositions according to claim 1, wherein the polyisocyanate is non-blocked polyisocyanates or non-blocked polyisocyanate mixtures with at least one of isocyanurate and bluret structure based on at least one of HDI, IPDI and 4,4'-diisocyanatodicyclohexylmethane.

4. Aqueous coating compositions according to claim 1, wherein the polyisocyanate is a hydrophilically modified non-blocked polyisocyanate.

5. Aqueous coating compositions according to claim 1, wherein the polyisocyanate is a non-blocked polyisocyanate hydrophilicized by internal emulsifiers.

6. Aqueous coating compositions according to claim 1, wherein the polyisocyanate is a non-blocked, allophanate-containing, polyether-hydrophilicized polyisocyanate.

7. Aqueous coating compositions according to claim 1, wherein the polyisocyanate is a water-dispersible or water-soluble blocked polyisocyanate.

8. Aqueous coating compositions according to claim 1, wherein the initiator is a radiation-activatable and/or heat-activatable initiator.

9. Process for preparing aqueous coating compositions according to claim 1, wherein the polyisocyanate, the polyurethane and the initiator are mixed with one another in succession in any order or simultaneously.

10. Method for producing a formulation selected from the group consisting of adhesives, sealants, sizes and paints, comprising:
    adding the aqueous coating composition of claim 1 to at least one of a binder, an auxiliary and an adjuvant.

11. Method of producing coatings, comprising:
    applying aqueous coating compositions according to claim 1, to a substrate, removing the water, and curing the coatings.

12. Method of producing coatings according to claim 11, wherein the substrate is are selected from the group consisting of wood, metal, plastic, paper, leather, textiles, felt, glass and mineral substrates.

13. Method of producing coatings according to claim 11, wherein the substrate is one of glass fibers and carbon fibers.

14. Method of producing coatings according to claim 11, wherein curing is effected by exposure to high-energy radiation.

15. Aqueous coating compositions according to claim 1, wherein the polyurethane is a reaction product additionally of at least one polyol compound having an average molecular weight of from 50 to 500, and a hydroxyl functionality of greater than or equal to 2 and less than or equal to 3.

16. Aqueous coating compositions according to claim 1, wherein the polyurethane is a reaction product additionally of at least one polyol compound having an average molecular weight of from 500to 13000 g/mol, with an average hydroxyl functionality of from 1.5 to 2.5.

17. Aqueous coating compositions according to claim 1, wherein the polyurethane is a reaction product additionally of at least one di- or polyamine.

* * * * *